Patented June 22, 1943

2,322,633

UNITED STATES PATENT OFFICE 2,322,633

WOOD PRESERVATION

Richard M. Hitchens, Webster Groves, Mo., assignor to Monsanto Chemical Company, St. Louis, Mo., a corporation of Delaware No Drawing. Application August 10, 1940, Serial No. 352,173

7 Claims. (Cl. 167—38.7)

The present invention relates to preservative compositions for the treatment of green wood or lumber to protect it from attack by various microorganisms which cause staining or decay of such wood. The invention relates particularly to a composition comprising sodium pentachlorophenate or a similar water-soluble salt of a polychlorophenol containing more than 2 atoms of chlorine substituted in the aromatic nucleus and a mixture of sodium carbonate and sodium bicarbonate.

It has heretofore been proposed to treat green lumber with aqueous solutions of water-soluble salts of polychlorophenols containing three or more chlorine atoms substituted in the aromatic nucleus to prevent the growth thereon of wood-staining organisms such as *Ceratostomella pilifera* and molds such as the common green molds of the genera, Trichoderma and Penicillium. When aqueous baths are applied to the dipping of green lumber, particularly oak and other hardwoods, the acidity increases during use of the bath and the polychlorophenol is precipitated therefrom and settles from such baths. As a result, lumber treated in such baths from which the polychlorophenol has precipitated or settled, is not adequately protected. In order to avoid such precipitation of polychlorophenols from such baths it has been common practice to add alkalis such as sodium hydroxide or sodium carbonate to baths containing water-soluble salts of polychlorophenols such as sodium tetrachlorophenate to counteract the acidity which develops on use of the bath. Such procedures, however, are not entirely satisfactory. The use of baths containing such alkalies as sodium hydroxide and sodium carbonate engenders yellow stains on wood.

It is an object of the present invention to provide a buffer or anti-acid for use in liquid baths containing water-soluble salts of polychlorophenols having more than two chlorine atoms in the aromatic nucleus which will counteract the acidity developed during the use of such baths for the treatment of green wood and which will be inexpensive and not have any staining or deleterious action on such green wood. Other objects and advantages of the invention, some of which are specifically set forth hereinafter, will be apparent from this description.

I have now discovered that a mixture of sodium carbonate and sodium bicarbonate, in the proportions of about 2 parts by weight of sodium bicarbonate to about 1 part by weight of sodium carbonate, on an anhydrous basis, will, when added to baths containing the specified water-soluble salts of polychlorophenols, maintain such baths within a desirable range of alkalinity and prevent the precipitation of free polychlorophenols from such baths after extensive use for treatment of green wood and lumber.

In applying this discovery it was found that the concentration of the water-soluble salt of the polychlorophenol is relatively unimportant and that the concentration of the mixture of sodium bicarbonate and carbonate in the bath is the only factor which needs any adjustment to the treatment of different woods and to different operating conditions and apparatus. Woods which tend to develop more acidity in the bath than others will require greater concentrations of the mixture in the bath to counteract the greater acidity which will develop before the bath is changed. The proportion of the 2 to 1 mixture which is added to the bath will also be dependent upon the length of time the bath is to be used in the treatment of any specific wood before the bath is discarded. The addition of fresh polychlorophenate to the bath to make up for that absorbed by the wood will not change substantially the condition prevailing in the bath provided sufficient of the sodium bicarbonate-sodium carbonate mixture are also added throughout the entire life of the bath.

The amount of the 2 to 1 mixture present in the bath has little effect on the initial pH of the solution. However, as the acidity increases (pH is reduced) during use of the bath the precipitating point of the polychlorophenol is approached and to compensate therefore additional amounts of the mixture may be added to increase the alkalinity within the permissible range.

The invention is particularly applicable to baths containing water-soluble salts of trichlorophenols, tetrachlorophenols, pentachlorophenol and mixtures thereof, especially to alkali-metal salts of such polychlorophenols, and particularly to the sodium salts of 2,4,6-trichlorophenol; 2,3,4,6-tetrachlorophenol and pentachlorophenol, or mixtures thereof. The invention is applicable also to water-soluble salts of polybromophenols and polyiodophenols although these materials have assumed no commercial importance as preservatives because of their cost in comparison with corresponding polychlorophenols. Generally 0.5% to 1.7% of sodium pentachlorophenate, equivalent to about 4 to 14 pounds per 100 gallons of water, are suitable concentrations for use in dipping wood to provide protection against the decay organism, *Fomes annosus*, green molds and the stain organism, *Ceratostomella pilifera*. If to such a bath is added the sodium carbonate-sodium bicarbonate mixture in an amount equal to that of the sodium pentachlorophenate (4 to 14 pounds per 100 gallons), the pH value of the solution will be approximately 9.2, which is below the alkalinity that causes discoloration of wood.

A very small concentration of acid developed in the bath from the wood treated will cause precipitation of pentachlorophenol from an aqueous solution of sodium pentachlorophenate. The presence of the sodium carbonate-sodium bicarbonate mixture will prevent this precipitation until considerable quantities of wood acids have accumulated in the bath. Illustrative of this is the result obtained on adding hydrochloric acid to sodium pentachlorophenate solutions. If a 100 ml. of an aqueous solution containing 4 pounds of sodium pentachlorophenate in 100 gallons of water is added N/10 hydrochloric acid, approximately 0.1 cc. of the acid will be required before precipitation of pentachlorophenol will begin, but if the same N/10 acid is added to 100 ml. of a solution containing 4 pounds of a 2 to 1 mixture of sodium bicarbonate and sodium carbonate in addition to 4 pounds of sodium pentachlorophenate in 100 gallons of water, precipitation of pentachlorophenol will not begin until approximately 19 cc. of N/10 hydrochloric acid have been added.

In applying the principles stated herein to the formulation of baths for wood treatment, it will generally be found that for ordinary dipping methods for the treatment of wood the sodium pentachlorophenate or similar water-soluble salts of the specified polychlorophenols and the 2 to 1 mixture of sodium bicarbonate-sodium carbonate may be used in equal amounts. Such baths will maintain sufficient alkalinity to prevent this precipitation for periods long enough to treat the usual amounts of wood that are treated under ordinary circumstances before the bath is discarded. However, less or greater ratios of the 2 to 1 sodium bicarbonate-sodium carbonate mixture may be desirable in accordance with the considerations hereinabove stated. The ratio of sodium bicarbonate to sodium carbonate may be varied somewhat without substantial change although in that event the initial pH value of the bath will be more greatly influenced than mere changes in amounts of the 2 to 1 mixture in the bath. The greater the ratio of sodium carbonate to sodium bicarbonate in the mixture the higher will be the initial alkalinity.

In using such baths no changes in the conventional procedure of dipping are contemplated. Furthermore, small amounts of wetting and dispersing agents and adjuvants having a synergistic effect on the polychlorophenate of such baths may be used without substantial changes in the practice hereinabove outlined. Such agents which may be added to the bath include materials such as sodium lauryl sulfates, alkylated aromatic sulfonic acid salts such as sodium dodecyl aromatic hydrocarbon sulfonates, sodium alkylated phenol sulfonates such as sodium dodecyl phenol sulfonate and dibutyl phenyl phenol sulfonate, petroleum sulfonic acids, sulfite waste liquors and the like.

The compositions of the invention, comprising water-soluble salts of the specified polychlorophenols and a mixture of sodium bicarbonate and sodium carbonate in the ratio of approximately 2 parts of sodium bicarbonate to 1 part of sodium carbonate, on an anhydrous basis, may be prepared in the form of mixed powders or in the form of tablets or briquettes which can be added directly to water to form baths suitable for wood treatment or which can be added to previously used baths to replenish or recharge them. Convenient compositions for addition to water or previously used baths are tablets or briquettes containing more or less definite proportions of the materials. Such tablets or briquettes are convenient for use in preparing wood-treating baths since they dispense with weighing operations and are furthermore advantageous from the standpoint of handling and obviate possible hazards and losses from dusting. A suitable tablet or briquette is one consisting of 50% by weight of sodium pentachlorophenate and 50% of a mixture of 2 parts of sodium bicarbonate and 1 part of sodium carbonate, calculated on an anhydrous basis, although such tablets or briquettes would be prepared advantageously with salts containing controlled moisture contents.

Although the particular advantages of the present invention relate to treatment of green wood or lumber, particularly hardwoods which engender acidity in such baths, the use of the sodium bicarbonate-sodium carbonate mixture counteracts the effect of carbon dioxide which might be absorbed by such baths. Wallboard stocks may be treated with the compositions of the invention. Lumber may be treated by brushing, spraying or applying a coating of the solution or bath of the invention in manners other than by dipping although dipping treatments, which are preferred treatments in the industry, are those to which the invention is particularly adapted and for which it will be found to be of greatest value.

Inasmuch as this specification comprises preferred embodiments of the invention it is to be understood that the invention is not to be limited thereto and that modifications and variations may be made therein in accordance with the principles herein set forth without departing substantially from the invention as defined in the appended claims.

I claim:

1. A composition for the preservation of cellulosic materials from decay, stain and mold organisms, which comprises a water-soluble salt of a polychlorophenol having more than two chlorine atoms substituted in the aromatic nucleus and a mixture of sodium bicarbonate and sodium carbonate in the ratio of approximately 2 parts of sodium bicarbonate to 1 part of sodium carbonate, on an anhydrous weight basis, said composition when present in water having an initial pH value within the range of approximately 6.8 to 9.2 and having no other constituents which would shift the pH value substantially from this range under such conditions.

2. A solid composition for the preparation of baths for the treatment of cellulosic materials to protect them from attack by decay, stain and mold organisms, consisting essentially of a water-soluble salt of a polychlorophenol having more than two chlorine atoms substituted in the aromatic nucleus and a mixture of sodium bicarbonate and sodium carbonate in the ratio of approximately 2 parts of sodium bicarbonate to 1 part of sodium carbonate, on an anhydrous weight basis.

3. A solid tabletted composition for the preparation of baths for the treatment of cellulosic materials to protect them from attack by decay, stain and mold organisms, consisting essentially of a water-soluble salt of a polychlorophenol having more than two chlorine atoms substituted in the aromatic nucleus and a mixture of sodium bicarbonate and sodium carbonate in the ratio of approximately 2 parts of sodium bicarbonate to 1 part of sodium carbonate, on an anhydrous weight basis.

4. A liquid bath for the treatment of cellulosic materials to protect them from attack by decay, stain and mold organisms, consisting essentially of an aqueous solution of a water-soluble salt of a polychlorophenol having more than two chlorine atoms substituted in the aromatic nucleus and a mixture of sodium bicarbonate and sodium carbonate in the ratio of approximately 2 parts of sodium bicarbonate to 1 part of sodium carbonate, on an anhydrous weight basis, said solution having an initial pH value within the range of approximately 6.8 to 9.2.

5. A composition as defined in claim 1 in which the water-soluble salt of the polychlorophenol is sodium pentachlorophenate.

6. A composition as defined in claim 1 in which the water-soluble salt of the polychlorophenol is sodium 2,3,4,6-tetrachlorophenate.

7. A composition as defined in claim 2 in which the water-soluble salt of the polychlorophenol is sodium pentachlorophenate and the sodium bicarbonate-sodium carbonate mixture is present in a proportion equal approximately to that of the sodium pentachlorophenate.

RICHARD M. HITCHENS.